Aug. 4, 1931.  P. V. MILLER  1,817,637
SNAP THREAD GAUGE
Filed Nov. 12, 1927   2 Sheets-Sheet 1
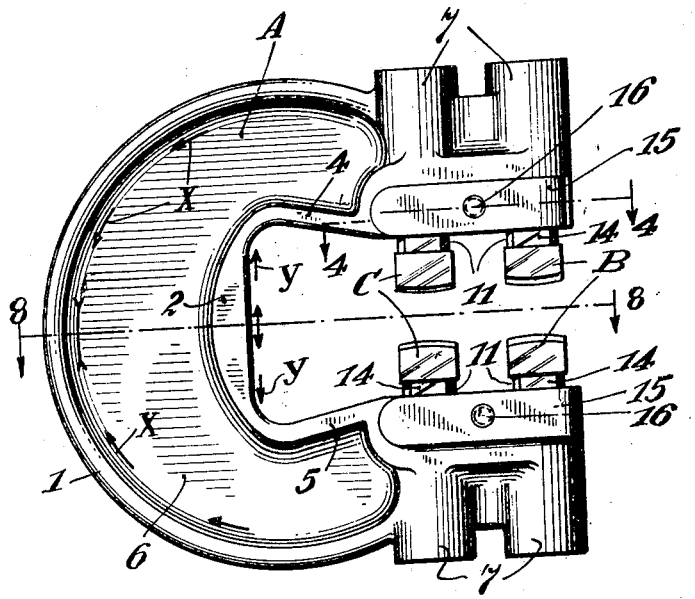
Fig.1.
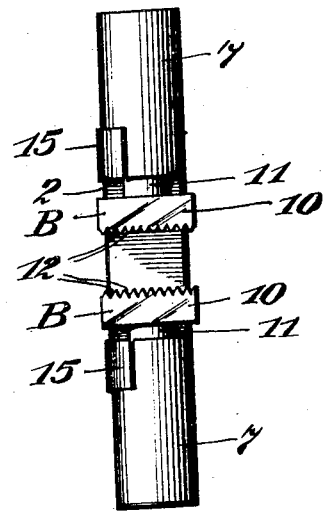
Fig.2.
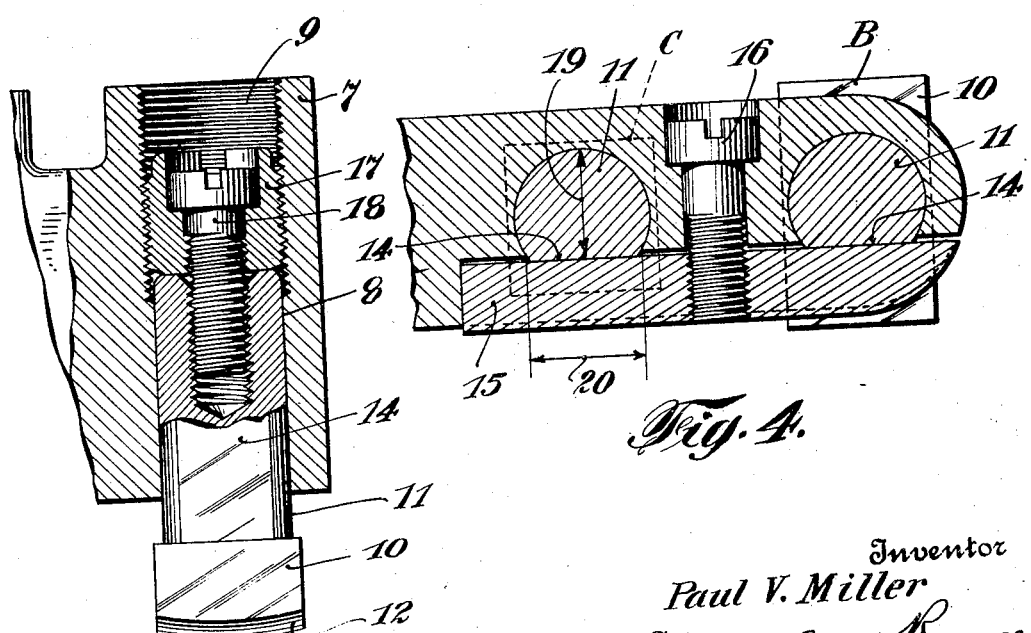
Fig.3.
Fig.4.
Inventor
Paul V. Miller
By his Attorney George Ramsey

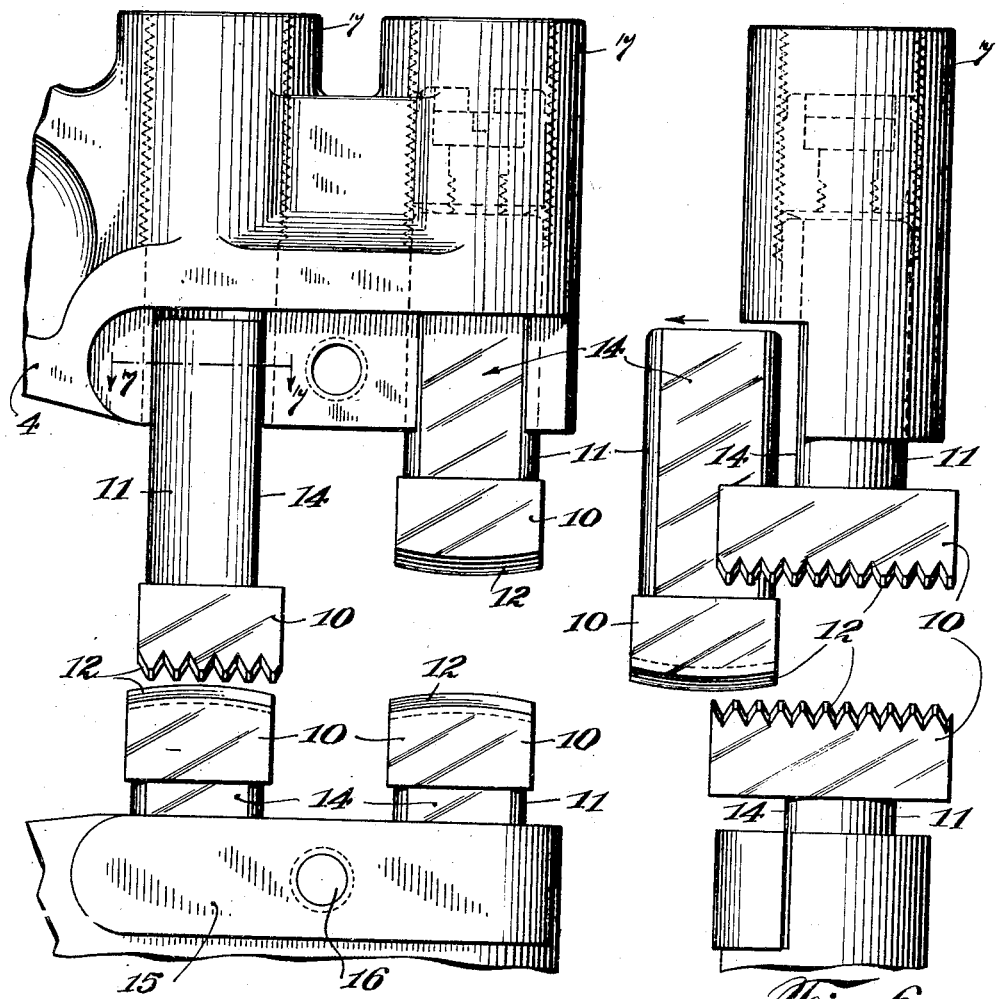

Patented Aug. 4, 1931

1,817,637

UNITED STATES PATENT OFFICE

PAUL V. MILLER, OF WOONSOCKET, RHODE ISLAND, ASSIGNOR TO THE TAFT-PEIRCE MANUFACTURING COMPANY, OF WOONSOCKET, RHODE ISLAND, A CORPORATION OF RHODE ISLAND

SNAP THREAD GAUGE

Application filed November 12, 1927. Serial No. 232,753.

The present invention relates generally to small tools and more specially to dimension gauges of the snap gauge type.

The present invention has to do more particularly with a snap thread gauge. There are three general types of thread gauges in common use; namely, the ring gauge type, which is a carefully manufactured nut; the second type is a form of snap gauge having roller gauging faces; and the third type is a gauge having fixed gauge faces with thread grooves therein.

The present invention comprises more specially a snap gauge having adjustable gauge heads provided with work faces having grooves of a predetermined depth; which heads are mounted in a very rigid frame of special form to resist forces tending to open the gauge to give a false test, and with locking mechanism for locking the gauge heads rigidly to the frame.

In thread gauges of the prior art having roller faces and the like, the pivoted or moving gauge faces destroy the feel of the gauge. It is both desirable and essential that the gauge heads shall be extremely rigidly mounted on the gauge body in order that the operator may feel the gauge of the work through the handle or frame of the gauge. It therefore follows that rigidity of mounting the gauge heads is important; and such rigidity must be applied so as not to subject the parts to forces tending to bend or distort the parts and thereby tend to disturb the accuracy of the gauge as the gauge ages.

It is realized that the present invention may be embodied in structures other than the specific disclosure herein and therefore the disclosure in the specification and drawings forming a part hereof is to be understood as being illustrative and not in the limiting sense.

Other and further objects of the present invention will in part be obvious and will in part be pointed out hereinafter by reference to the drawings in which like characters are utilized to represent like parts throughout the several figures thereof.

Fig. 1 is a side view of one embodiment of the present invention.

Fig. 2 is an end view of the gauge shown in Fig. 1.

Fig. 3 is a detail view of the adjusting and locking mechanism of one of the gauge heads showing portions of the end lock in section.

Fig. 4 is a sectional view taken on line 4—4 of Fig. 1 and illustrates the side lock for the gauge heads.

Fig. 5 is a detail view of the end of the gauge with the frame broken away and shows the upper locking plate removed with one of the gauge heads partly removed from the frame.

Fig. 6 is a front view of the detail shown in Fig. 5.

Fig. 7 is a view taken on line 7—7 of Fig. 5.

Fig. 8 is a view taken on line 8—8 of Fig. 1.

The gauge comprising the present invention is a snap thread gauge having a sturdy C-shaped main frame A in which are mounted the "go" gauge heads B and the "no go" gauge heads C. One of the most essential characteristics of any gauge is accuracy and in snap gauges accuracy is usually accompanied by strength and rigidity. The present gauge is designed particularly with reference to strength and rigidity in order to secure great accuracy. The main frame A therefore is designed to comprise an extremely rigid member formed with a substantially circular curved outer rib 1 with an inner rib having a straight or flat base portion 2 which is thickened adjacent its mid portion and substantially straight side portions 4 and 5 angularly disposed to the base portion. The inner rib and the outer rib are joined by a web 6 in such manner as to form a substantially C-shaped channel member of I-shape in cross section (Fig. 8). This formation is particularly strong in that the forces tending to open the gauge react on the main frame as compressive forces on the outer rib indicated by the arrows X and as tension forces on the inner rib indicated by arrows Y. Since the outer rib is circular it is of the best form to withstand compressive forces of this type, and since the inner main rib is straight it is in the best form to withstand tension forces of the type to which the gauge is subjected. Aside from being of great strength the frame is particularly well adapted for handling in that the operator may place two fingers through the opening provided by the inner rib and rest the curved outer rib of the frame in the palm of his hand. The flat inner rib 2 permits the two fingers to tightly grasp the frame of the gauge without crowding the fingers one against the other as would be the case if the inner opening were circular to correspond with the outer rib.

The forward end of the gauge is provided with oppositely disposed sockets 7, each of which is provided with a cylindrical opening 8 the outer portion of which is screw threaded as at 9. The gauge heads B and C are provided with head portions 10 and with cylindrical stems 11 which accurately fit the openings 8 and are adapted to slide longitudinally therein for adjustment of the heads. These gauge heads are each provided with curved ridges or teeth 12 which comprise the gauge faces. The gauge heads B comprising the "go" gauge members are mounted in the front sockets 7 of the frame and the gauge heads C comprising the "no go" gauge members are mounted in the next pair of sockets with a slight space between the two pairs of gauge heads so that the work entirely leaves the "go" pair of heads B, before encountering the "no go" gauge heads C. The curved ridges preferably are of slight helical form as well as being curved and the "go" gauge heads B have longer faces than the "no go" heads, and therefore are provided with more of the teeth or ridges 12 than the "no go" heads. This gauge head B therefore gauges the work both for pitch diameter and lead, while the "no go" heads C, gauge only as to the pitch diameter. The gauging action is a line contact between the side of each thread of the work and the side of each tooth on the gauge head.

The purpose of the present invention is also to provide an adjustable snap gauge wherein one gauge frame may be utilized for different gauge heads or where worn gauge faces may be quickly replaced. To this end adjusting and locking mechanism is provided to rigidly secure the gauge heads in predetermined positions in the frame. The cylindrical stems 11 of the gauge heads are each provided with flat portions 14 on one side. Clamp plates 15 operated by clamp screws 16 are adapted to fit tightly against the flat surfaces 14 on the gauge head stems 11. The clamp plates 15 are preferably made of hardened tool steel so that the plates are very rigid with substantially no bend or spring when clamp screws 16 are tight. This side clamp imposes no distortive forces on either the frame or the gauge heads that will affect the accuracy of the gauge, but at the same time tightly clamps the gauge heads in the cylindrical openings 8 in the sockets 7. In order to permit the movement of paired gauge heads toward each other or in order to change the gauge dimension between the gauge faces, adjustment screw plugs 17 are threaded to fit the screw threads 9 in the openings 8. These adjustment plugs bear directly on the ends of the cylindrical stems 11 of the gauge heads. Each adjustment screw plug is provided with a cylindrical opening which fits a locking screw 18 that screws into the end of the stem 11 of the gauge heads. By loosening the locking screw 18 and turning the adjustment screw plug 17 it will be observed that the gauge heads may be caused to recede from or approach toward each other, thereby changing the dimension of the gauge and permitting a gauge setting to a predetermined standard to be made.

In making the gauge settings preferably a standard screw or helix of the "go" size is utilized for setting the "go" heads and a standard of the "no go" size is utilized for the "no go" setting. The standard is set between the gauge faces on the top of the crowns thereof. The adjustment screw plug 17 is then operated to force the gauge heads to clamp this standard between the gauge faces. Then the locking screw 18 is tightened, thereby locking the gauge head which was moved in position. After the dimensions between the jaws of the gauge have been thus predetermined, the clamp plate 15 on the side of the gauge is set tightly against the flat portions 14 on the cylindrical stems 11 of the heads that were adjusted, thereby rigidly clamping the gauge heads in place. It will be observed that the adjustment plug 17 and locking screw 18 set-up opposed forces extending lengthwise of the sockets 7 and the cylindrical stems 11 of the gauge heads so that no distorting forces are set up by these locking members that disturb the accuracy of the gauge. At the same time, when the two locks, namely, the side lock and the longitudinal or dimensional lock, are set, the gauge heads are so rigidly secured to the frame as to be substantially the same as an integral part thereof.

As illustrated in Figs. 5 to 7 of the drawings, the flat portions 14 on the sides of the stems 11 facilitate the removal and insertion of gauge heads for replacement or assembly. In gauges measuring relatively small dimensions it would be necessary to make the stems 11 so short as to sacrifice accuracy. Therefore, by making the flats 14 of such depth that the cross-dimensions 19 (Fig.

4) is slightly less than the open side dimension 20 of the opening 8, when the clamp plate 15 is removed, the gauge head may be rotated to bring the flat 14 into the position illustrated by the back or "no go" gauge head in Figs. 5, 6, and 7. When the stem has been rotated to this position the dimension 19 is parallel to the opening 8 and the rotated gauge head may be withdrawn from the frame by a movement parallel to the flat 14, as illustrated in Fig. 7. This is of considerable importance in maintaining sufficient length to the stem to afford rigidity to the gauge head and at the same time be able to remove the gauge heads from the frame.

The rounded gauge faces 12 greatly facilitate the gauging action, in that they permit correct work pieces being gauged to gradually come against the gauge faces and to pass through the "go" gauge faces easily, and encounter and partly enter the "no go" faces which are set at a slightly closer dimension than the "go" faces. If the work passes through the "go" gauge faces and does not pass through the "no go" it is acceptable; but if it will not pass through the "go" gauge faces it is too large and not acceptable, and if it passes through both the "go" and the "no go" faces, it is too small and not acceptable. The "go" gauge gauges as to pitch diameter and lead of the screws whereas the "no go" gauge gauges as to pitch diameter only. If the lead is wrong although the pitch diameter may be correct, the work will not pass the "go" gauge. If the lead is correct and the pitch diameter is wrong, the work will not pass the "go" gauge, so therefore work passing the "go" gauge only is gauged as correct as to both pitch diameter and lead.

Having described my invention, I claim:

1. A snap gauge comprising a main frame provided with a circular opening to receive a gauge head member, a gauge head provided with a cylindrical stem adapted to fit said opening, said cylindrical stem having a flattened face parallel to its axis, said gauge frame being cut away adjacent said opening to expose a portion of one side thereof, the exposed portion being slightly wider than the thickness of the said stem back of the flattened face whereby said stem may be rotated and removed sidewise from said opening, and a clamping plate adapted to set in the cut away portion of said main frame and to bear against the flattened face on said gauge head to clamp said gauge head firmly in said main frame.

2. A snap gauge comprising a solid frame provided with a plurality of cylindrical openings, two pair of adjustable gauge heads having substantially cylindrical stems slidable in said cylindrical openings in said frame, one pair of gauge heads comprising "go" gauge members and the other pair of gauge heads comprising "no-go" gauge members, the "go" gauge members having relatively long gauge faces traversed by a plurality of sections of thread ribs comprising portions of a helix of relatively large diameter whereby said "go" gauge members gauge work as to both pitch diameter and lead, the "no-go" gauge heads being of less length and having fewer thread section ribs gauge work as to pitch diameter only, said cylindrical stems each being formed with a flat surface parallel to its axis, said main frame having a portion adjacent the mouth of the gauge cut away to provide passageways leading into said cylindrical openings, said passage-ways being of a width slightly greater than the greatest dimension of the thickness of said stems measured at right angles to said flat surfaces whereby said gauge heads may be rotated in said cylindrical openings and withdrawn sideways therefrom, and removable means to normally lock said stems in place in said frame.

3. A snap thread gauge comprising a frame provided with cylindrical openings adapted to receive gauge head members, gauge head members provided with cylindrical stems fitted in said openings, said cylindrical stems each being formed with a flat surface parallel to its axis, said main frame having a portion adjacent the mouth of the gauge cut away to a sufficient depth to expose said openings to a width slightly greater than the greatest dimension of thickness of said gauge head stems measured at right angles to said flat surfaces, whereby said gauge heads may be rotated in said cylindrical openings and withdrawn sidewise therefrom.

4. A snap thread gauge comprising a main frame provided with a cylindrical opening to receive a gauge head stem; a gauge head provided with a cylindrical stem to fit said opening; said stem having a flattened surface extending lengthwise of said stem, said main frame being cut away at the side of said opening adjacent one side of the gauge to expose said flat side of said stem; and a clamping plate adapted to set in said cut away portion and bear against said flat side; the thickness of said stem measured at right angles to said flat side being less than the width of the exposed opening whereby said stem may be rotated, and removed sidewise from said opening when said plate is removed.

5. A snap gauge comprising a C-shaped solid gauge frame having pairs of opposed cylindrical openings adapted to receive gauge heads, two pair of gauge heads having stems adapted to fit said cylindrical openings, said heads being larger than said openings and the said stems and heads being of such length as to prevent removal from said frame by a movement in the direction of the axis of the openings, said frame being cut away to provide lateral openings leading to said cylindrical openings, said stems having reduced portions as to one dimension measured at right angles to the axis of the stems whereby said stems may be removed from said frame through said lateral openings in the sides of the cylindrical openings, and means to normally lock said gauge heads in position in said frame.

PAUL V. MILLER.